(12) United States Patent
Kejser et al.

(10) Patent No.: US 11,914,565 B1
(45) Date of Patent: Feb. 27, 2024

(54) SYSTEM AND METHOD FOR IDENTIFYING MATCHING PORTIONS OF TWO SETS OF DATA IN A MULTIPROCESSOR SYSTEM

(71) Applicant: Yellowbrick Data, Inc., Palo Alto, CA (US)

(72) Inventors: Thomas Kejser, Tallinn (EE); Charles E. Gotlieb, San Juan, PR (US)

(73) Assignee: Yellowbrick Data, Inc., Mountain View, CA (US)

( * ) Notice: Subject to any disclaimer, the term of this patent is extended or adjusted under 35 U.S.C. 154(b) by 234 days.

(21) Appl. No.: 17/481,301

(22) Filed: Sep. 21, 2021

Related U.S. Application Data

(63) Continuation of application No. 16/867,452, filed on May 5, 2020, now Pat. No. 11,126,606, which is a continuation of application No. 15/340,949, filed on Nov. 1, 2016, now Pat. No. 10,642,808.

(60) Provisional application No. 62/249,268, filed on Nov. 1, 2015, provisional application No. 62/249,265, filed on Nov. 1, 2015.

(51) Int. Cl.
| | |
|---|---|
| *G06F 16/22* | (2019.01) |
| *G06F 16/215* | (2019.01) |
| *G06F 16/2453* | (2019.01) |
| *G06F 16/2455* | (2019.01) |
| *G06F 16/27* | (2019.01) |

(52) U.S. Cl.
CPC ........ *G06F 16/2255* (2019.01); *G06F 16/215* (2019.01); *G06F 16/2282* (2019.01); *G06F 16/24544* (2019.01); *G06F 16/2456* (2019.01); *G06F 16/278* (2019.01)

(58) Field of Classification Search
CPC .......................... G06F 16/2255; G06F 16/2456
See application file for complete search history.

(56) References Cited

U.S. PATENT DOCUMENTS

| | | | |
|---|---|---|---|
| 9,317,548 B2* | 4/2016 | Attaluri | G06F 16/2282 |
| 2007/0245119 A1* | 10/2007 | Hoppe | G06F 16/2255 |
| | | | 707/E17.025 |
| 2009/0182855 A1* | 7/2009 | Golwalkar | G06F 16/2255 |
| | | | 709/223 |
| 2010/0322250 A1* | 12/2010 | Shetty | G06F 9/505 |
| | | | 370/395.32 |
| 2012/0011133 A1* | 1/2012 | Faerber | G06F 16/2255 |
| | | | 707/754 |
| 2012/0166401 A1* | 6/2012 | Li | G06F 16/2255 |
| | | | 707/E17.005 |
| 2012/0278323 A1* | 11/2012 | Chattopadhyay | ............. |
| | | | G06F 16/24532 |
| | | | 707/E17.089 |
| 2014/0250142 A1* | 9/2014 | Pradhan | G06F 16/2255 |
| | | | 707/765 |
| 2016/0004716 A1* | 1/2016 | Akirav | G06F 16/2255 |
| | | | 707/692 |
| 2016/0026667 A1* | 1/2016 | Mukherjee | G06F 16/2456 |
| | | | 707/714 |
| 2016/0357743 A1* | 12/2016 | Swaminathan | G06F 16/2255 |
| 2018/0011893 A1* | 1/2018 | Kimura | G06F 16/2365 |

* cited by examiner

*Primary Examiner* — Pierre M Vital
*Assistant Examiner* — Jedidiah P Ferrer
(74) *Attorney, Agent, or Firm* — Innovation Partners LLC; Charles E. Gotlieb

(57) ABSTRACT

A system and method matches data from a first set of data with that of an other set of data.

18 Claims, 7 Drawing Sheets

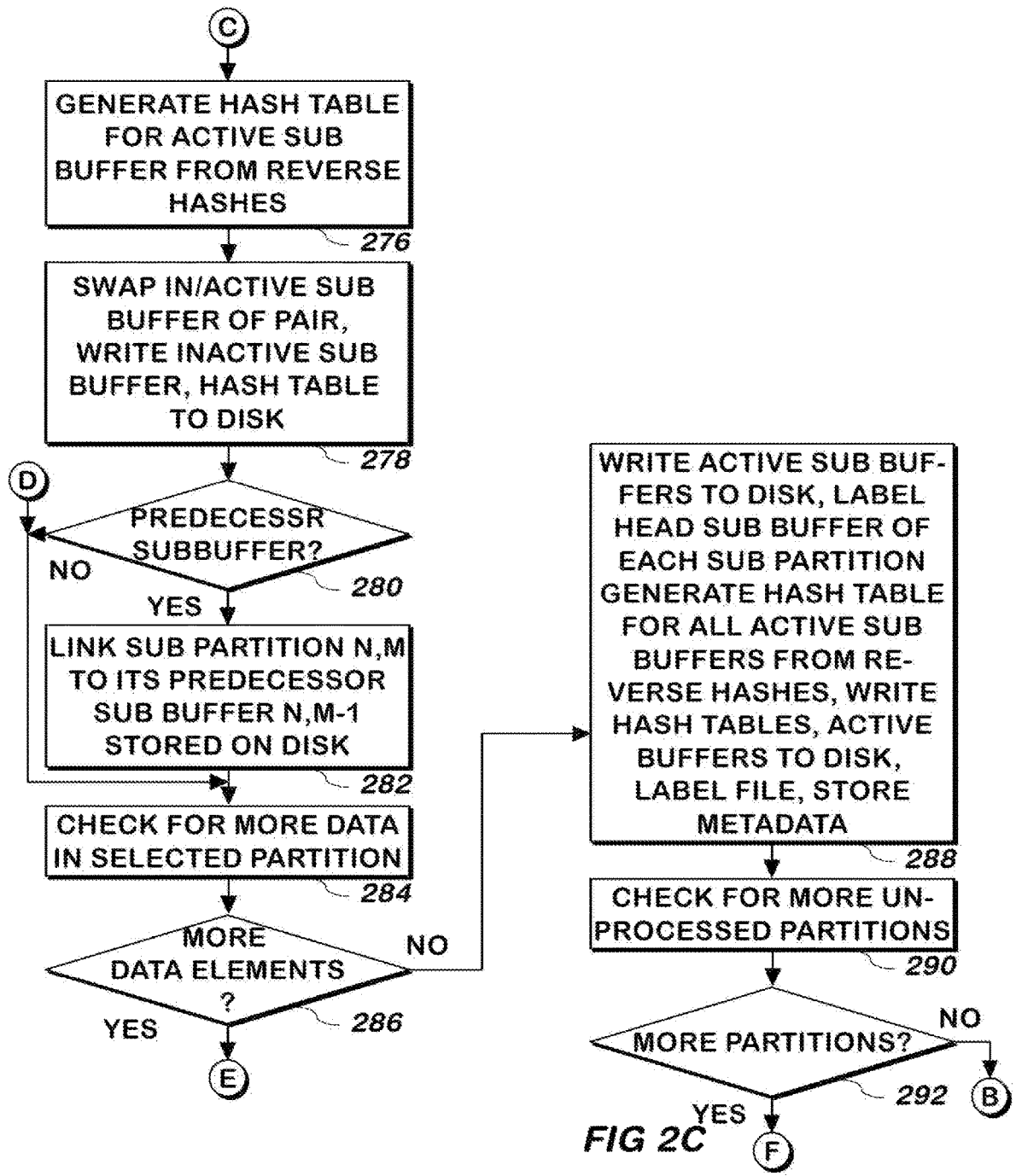

SYSTEM AND METHOD FOR IDENTIFYING MATCHING PORTIONS OF TWO SETS OF DATA IN A MULTIPROCESSOR SYSTEM

RELATED APPLICATIONS

This application is a continuation of U.S. patent application Ser. No. 16/867,452 entitled, "System and Method for Identifying Matching Portions of Two Sets of Data In a Multiprocessor System" filed by Thomas Kejser and Charles E. Gotlieb on May 5, 2020, which is a continuation of U.S. patent application Ser. No. 15/340,949 entitled, "System and Method for Identifying Matching Portions of Two Sets of Data In a Multiprocessor System" filed by Thomas Kejser and Charles E. Gotlieb on Nov. 1, 2016, which claims the benefit of U.S. Provisional Patent Application Ser. No. 62/249,265 Entitled, "Method and Apparatus for Identifying Matching Portions of Two Sets of Data In a Multiprocessor System" filed by Thomas Kejser and Charles Gotlieb on Nov. 1, 2015 and U.S. Provisional Patent Application Ser. No. 62/249,268 Entitled, "Memory- and Cache-Aware Method and Apparatus for Identifying Matching Portions of Two Sets of Data In a Multiprocessor System" filed by Thomas Kejser and Charles Gotlieb on Nov. 1, 2015, and is related to U.S. patent application Ser. No. 15/340,950 entitled "Cache-Aware System and Method for Identifying Matching Portions of Two Sets of Data In a Multiprocessor System" filed by Thomas Kejser and Charles Gotlieb on Nov. 1, 2016, and to U.S. patent application Ser. No. 15/340,952 entitled "Memory-Aware System and Method for Identifying Matching Portions of Two Sets of Data In a Multiprocessor System" filed by Thomas Kejser and Charles Gotlieb on Nov. 1, 2016, each having the same assignee as the present application and each is hereby incorporated by reference in their entirety.

FIELD OF THE INVENTION

The present invention is related to computer software and hardware and more specifically to computer software and hardware for identifying matches between data sets in a multiprocessor system.

BACKGROUND OF THE INVENTION

Computers can be used to identify matches between data sets. Current approaches are suboptimal.

SUMMARY OF INVENTION

A system and method matches a first data set with an other data set using a multi core processor system. The smaller data set is identified and processed first. Before processing, a check is made to determine whether the same version of the data set has already been processed. If so, the smaller data set is not processed and processing continues with the other data set as described below.

To process the first data set, the smaller of the two, one or more cores of the multi core processor assign the data elements of the data set to one of several partitions on the basis of some, but not all, of a hash result from hashing that data element, and store to disk in one or more buffers for each partition, each buffer containing, for each of its data elements, an identifier of the data element, the data element, and its hash result. Each partition corresponds to a different block of the portion of the hash result used for assignment.

The multiple cores of the multi core processor each select an unprocessed partition and process all of the data elements from that partition into sub partitions by marking the selected partition as processed, and then assigning each data element in the selected partition of the first data set to one of several smaller sub partitions of that partition, on the basis of the remainder of the hash result of that data element, the portion of the hash result not used to assign the data element to the partition, and storing onto disk the data elements into a backwards linked list of one or more sub buffers for each sub partition. Each sub partition corresponds to a different block of the hash result, with each such block corresponding to an approximately equal in number of hash results. The number of sub partitions is selected based on a given sub buffer size, such as 32K, to fill the available memory with two sub buffers per sub partition while allowing both sub buffers for all sub partitions being processed simultaneously by all of the cores to fit in the available memory at the same time. Each sub buffer contains, for each of its data elements, an identifier of the data element, the data element, and its hash result, as well as a hash table that identifies the location of each data element corresponding to each hash result in the sub buffer.

The other data set to be compared to the first data set consists of multiple cells and sufficient cells are read into memory to fill the memory (while allowing for other storage as described herein) and then each cell is hashed using the same hash function as was used for the first data set. Each cell is then assigned to one of several sub partitions for the other data set using the hash result for that cell in the same manner as data elements in the first data set were assigned to sub partitions, with each sub partition of the other data set corresponding to a different block of hash results, each of the blocks matching a block corresponding to a sub partition of the first data set.

A different sub partition is then processed by each core of the multi core processor until they have all been processed. The core selects an unprocessed sub partition and marks the sub partition as processed. For each cell in the sub partition, the core uses that cell's hash result and attempts to locate any matching hash results in the corresponding sub partition of the first data set using the one or more hash tables for the sub partition. If a matching hash result is located, the core then compares the cell with the data element corresponding to the matching hash table entry it located. If the cell matches the data element, the identifier of the cell and the data element are output. The cores repeat this process until all sub partitions are processed. Additional cells from the other data set are then read into memory and the process repeats until all cells of the other data set have been processed in this manner.

If the first data set has already been processed and stored, processing of the first data set may be skipped, and the stored version is just reused for the comparisons and to identify the blocks of hash results for the sub partitioning of the other data set.

In one embodiment, the size of data from the first data set is identified after data elements have been assigned to the partitions. If the size of the data, including its associated hash results, identifiers, and hash tables will fit into the CPU cache with sufficient space for other matching operations, the partition assignments are discarded and a single partition for the entire first data set is generated and processed in a manner similar to that described above to identify matches with the other data set. If the size of the data, including its associated hash results, identifiers, and hash tables will fit into the CPU memory with sufficient space for other matching operations, the partition assignments are retained, but the sub partition assignments are made using only one sub partition for each partition and matching proceeds as described above.

BRIEF DESCRIPTION OF THE DRAWINGS

FIG. 2C is a part of the flowchart illustrating a method of matching data from different sets of data using a multi core processing system according to one embodiment of the present invention.

DETAILED DESCRIPTION OF A PREFERRED EMBODIMENT

Figure 1:
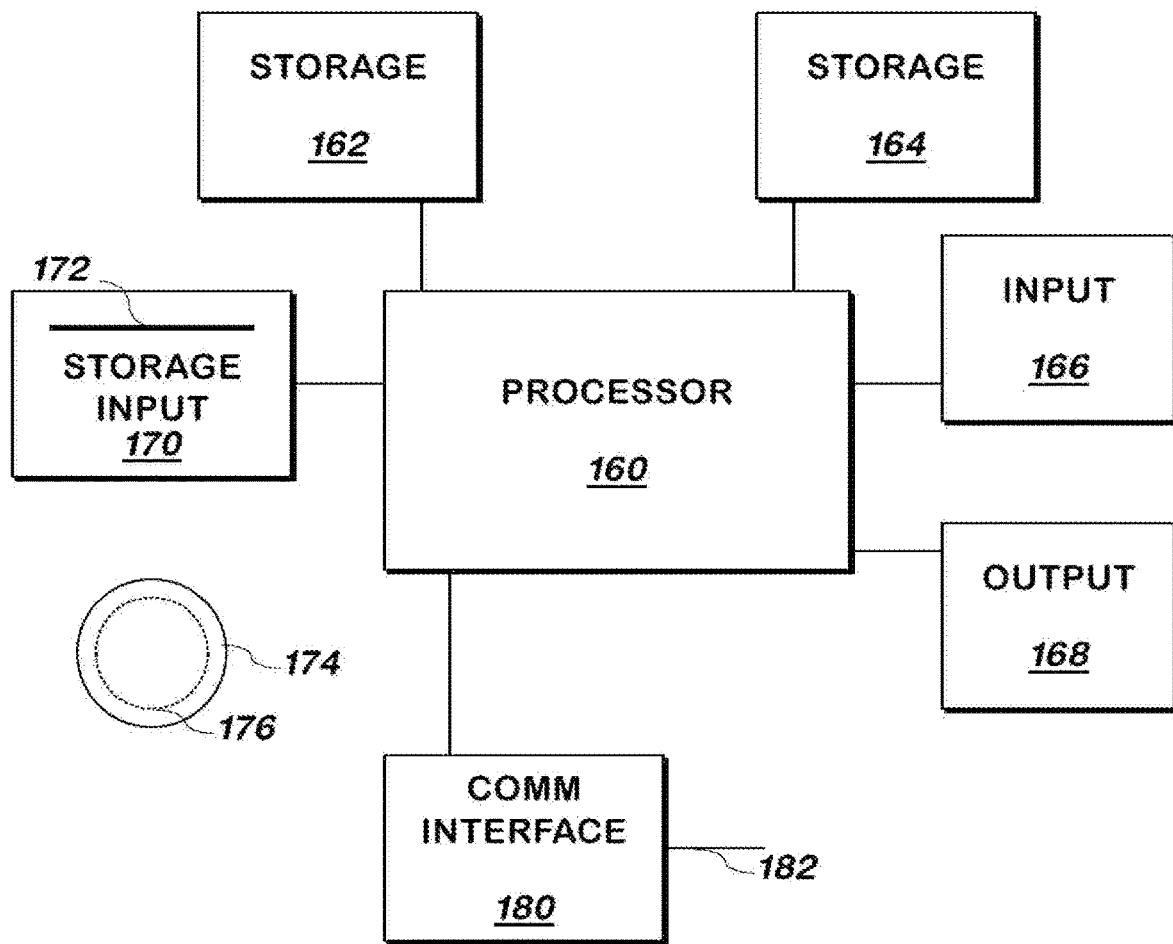
FIG. 1 is a block schematic diagram of a conventional computer system.

The present invention may be implemented as computer software running on a conventional computer system, computer software embodied on a non-transitory storage media, computer hardware, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive (conventional or solid state) or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional hardware processor. Each of the processor and storage components described here may be part of a larger processor system and/or memory system not shown in the Figure.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XP, VISTA, 7 or 8) commercially available from MICROSOFT Corporation of Redmond Washington or a Macintosh computer system running the OS X operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2A:
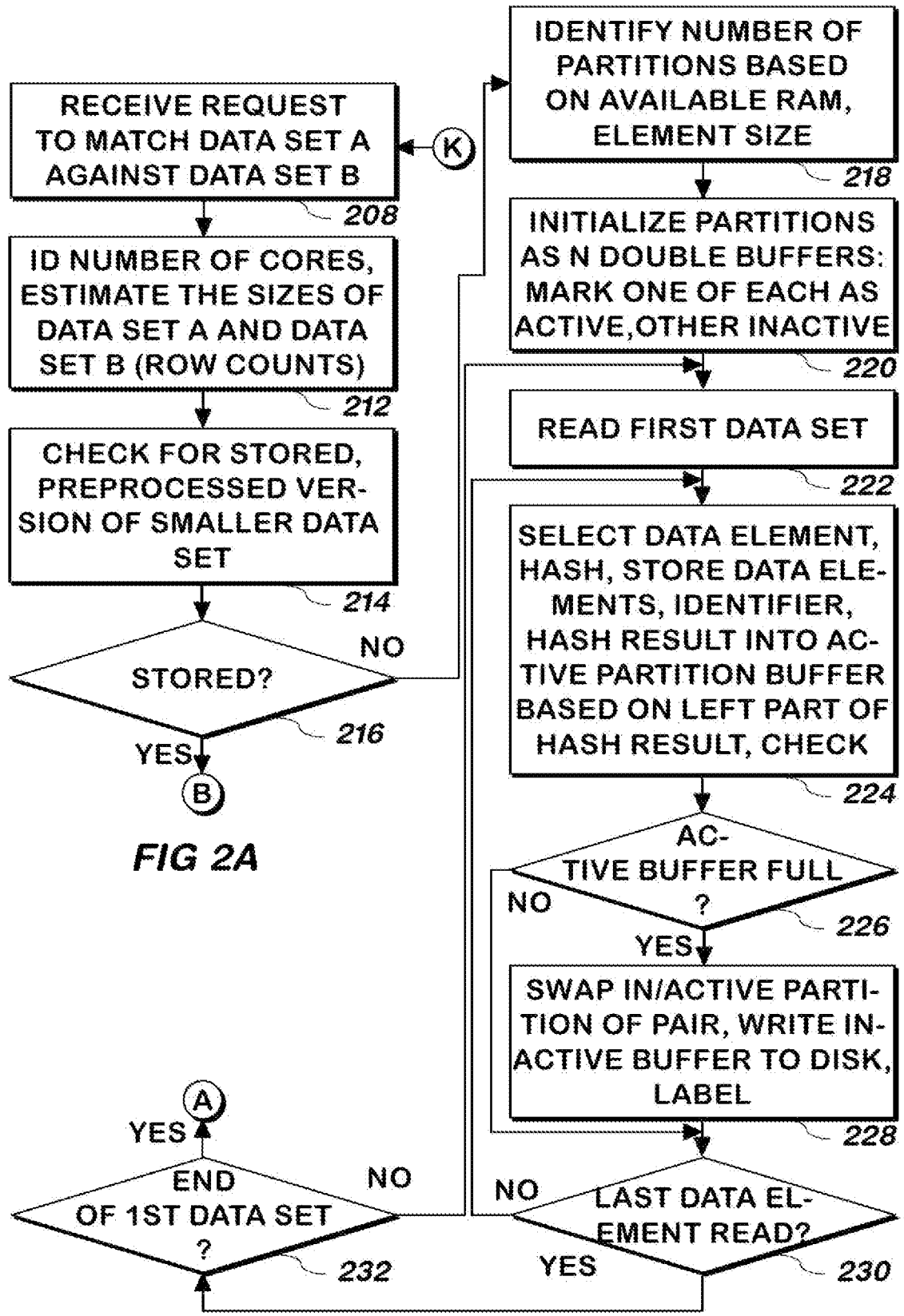
FIG. 2A is a part of a flowchart illustrating a method of matching data from different sets of data using a multi core processing system according to one embodiment of the present invention.
Figure 2B:
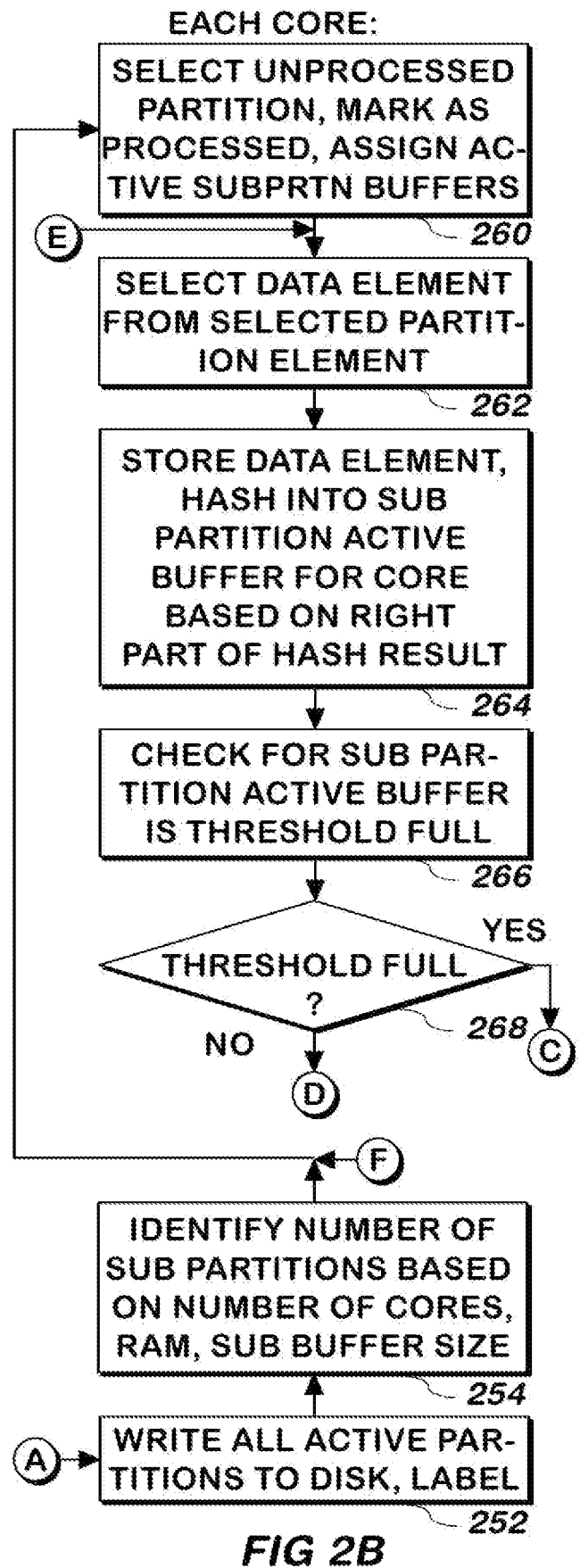
FIG. 2B is a part of the flowchart illustrating a method of matching data from different sets of data using a multi core processing system according to one embodiment of the present invention.

FIGS. 2A, 2B, 2C, 3A and 3B are a flowchart illustrating a method of matching two data sets according to one embodiment of the present invention. Referring now to FIG. 2A, a request to match data in a first data set against data in an "other data set", is received 208. The request may include a handle or other reference to each of the two data sets.

Sizes of the available memory and the CPU level cache are identified 210, for example, by requesting them from an operating system.

The sizes or relative sizes of the two data sets are identified or estimated, for example, by using their row counts, (the data set with the higher row count is considered larger, the other data set, smaller) 212, and row counts of each data set are compared to determine which is larger and which is smaller. Step 212 includes identifying the number of cores in the processor, for example by retrieving them from an operating system or receiving them from a system administrator.

A check is made 214 to determine whether the smaller data set has been preprocessed, with the preprocessed version having been stored as described herein. In one embodiment, a determination of whether either data set has been preprocessed is made. If either data set has been preprocessed, it is used as the first data set. If both data sets have been preprocessed, the preprocessed version of the larger data set is used as the first data set in one such embodiment, and that of the smaller data set is used as the first data set in another embodiment. In one embodiment, each data set or data set version contains a unique identifier, or an identifier is identified for each processed data set that is likely to be unique, such as the name and location of the data set, and the date and time it was stored (or any other metadata), and such identifier is stored associated with the preprocessed version of the data set, so as to facilitate such determination. If neither has been preprocessed 216, the method continues at step 218, and otherwise 216, the method continues at step 312 of FIG. 3A: the preprocessed version of the first data set will be used and will not be processed as described in FIGS. 2A, 2B, and 2C. In one embodiment, the minimum size of CPU cache or memory required to use the file is stored as part of the label of the file. If a stored file requires more than the amount CPU cache or memory that is available, the preprocessed version of the file is considered not to be available. In one embodiment, if there are multiple versions of the file with different minimums, the one selected to be used will be the one with the minimum closest to, but not exceeding, the available memory or cache. Such information is stored with or in the file, for example, as part of the label for the file. In one embodiment, the stored minimum maybe be the amount of memory used by the first data set, plus an amount that allows for storage of other information from the other data set as described herein, plus any other storage needed (e.g. scratch pad storage) for operation of the method as described herein and any overhead.

At step 218, a number of partition table elements is identified based on the size or average size of each partition table element (each has the same size as the others in one embodiment), and an amount of random access memory available to the computer system that will perform steps 218-232 for such purpose. In one embodiment, the partition element size is 1 Megabytes, though other sizes may be used. Each partition will have a double buffer, so there will be up to half as many partitions as the memory that is available to hold them. Thus, if the partition size is 1 Megabyte, and there are 1000 megabytes available for such purpose, there will be 500 partitions. Other arrangements may be used to improve the use of memory, such as not allocating space for all of the empty buffers until needed, allowing use of more of the memory for the active buffer of the double buffer pair. The available memory is allocated into the partitions, with two buffers for each partition, and for each such pair of buffers, one is identified as the active buffer, and the other, inactive 220.

The first data set is read 222 (either to the end of the first data set, or until the allocated memory, less other memory to be used as described herein, is full, with the remainder read and processed after, as described herein), and a data element in the first data set not already selected is selected and hashed to produce a hash result. In one embodiment, the first data set is read one or more data elements at a time and then processed as described herein, until all data elements have been processed. Thus, reading a data set may include providing a command to obtain the data set and then receiving and processing data elements in the data set one or several at a time as described herein and then receiving and processing more of them, and so on. Thus, the data elements may not be all loaded into memory and then processed.

Any conventional hash algorithm that will provide a diverse set of hash results for all of the data elements is used, such as MD5, SHA1, etc. In one embodiment, the first data set is the smaller of the two data sets. Each data element of the first data set is a portion of the first data set, for example, if the first data set is one or more columns, or an entire table, of a database, each data element is a row from the applicable columns. The leftmost bits of the hash result of a data element are used to assign that data element to a partition, with each partition corresponding to an approximately equal number of combinations of such bits. For example, if the leftmost 4 bits of the hash result are used to assign a hash result to a partition, and there are 8 partitions with each partition having a double buffer, each partition will store two combinations of those leftmost bits. Thus, each partition will correspond to an approximately equal number of blocks of potential hash results. The data element, and the hash result are stored into the active buffer for the partition so assigned, along with an identifier of the data element, which may be its order, or a row number received with it. The amount of data stored in the buffer is maintained to correspond to the data in the buffer, and the buffer is checked to determine whether the buffer is full or nearly full 224.

If the active buffer for the partition most recently assigned is full 226, the other partition in the double buffer is marked as active, the full or nearly full buffer is marked as inactive, and the inactive buffer is written to disk 228, labeled with a label identifying the block of hash results to which it corresponds. If there are no more data elements in the first data set read 230, the method continues at step 232 and otherwise 230, the method continues at step 224, processing the next unselected data element until all read data elements have been processed as described above with respect to step 224.

If the end of the data set read is reached 230, if there are more data elements in the first data set that were not read 232, the method continues at step 222. If there are no more data elements in the first data set that were not read 232, a determination is made as to whether all of the processed data elements (including the data, the hash table or tables required, from the first data set) can fit into memory that will leave sufficient space to perform the other functions of the matching of the other data set as described below. If so, a determination is made as to whether the all of the processed data elements can fit into the CPU cache 240. If there is sufficient space in the memory 242, if there is sufficient space in the CPU cache 244, the data from the buffers, in memory and stored to disk, is used to build a single sub buffer or multiple sub buffers of a single sub partition (i.e. a single sub partition for a single partition) for the entire first data set, and a hash table is built that maps the hash results to the single sub partition or hash tables for each sub buffer are built for the single sub partition as described above, the buffer is stored and labeled as described herein and the metadata for the first data set is stored associated with the stored processed first data set as described herein to allow the stored processed first data set to be reused to process another request.

If there is insufficient space in the CPU cache 244, all active buffers with data are written to disk as described with respect to step 252 and the number of sub partitions per partition is identified as one 248. The method continue sat step 260.

If there is insufficient space in memory to hold all of the processed data elements 242, the remaining active partitions are written to disk and each is labeled with the leftmost bits of the hash result to which each partition corresponds 252. A number of sub buffers, i.e. partitions of the partitions, is identified based on the number of cores, the size of the random access memory and a buffer size, which is 32 Kilobytes in one embodiment 254, to allow all of the sub buffers in the sub partitions being processed by the cores at any given time to be in memory simultaneously.

In one embodiment, each core processes a portion of the memory to allocate data elements to partitions.

Each core is then directed to proceed as described in steps 260-292, which the cores then do simultaneously. Each core then selects one unprocessed partition, which may have been stored from one or more buffers described above, marks the selected partition as processed to prevent its selection by another core, and assigns half the sub buffers for the partition as active, the others being considered as inactive 260. Each pair of sub buffers, one active, one inactive, will correspond to a sub partition of the selected partition. Each sub partition corresponds to an equal or nearly equal number of possible values of the right side of the hash result, and the core assigns the data element to the sub buffer corresponding to the right side of the hash result for that data element. A data element is selected from the selected partition 262. The data element is stored 264 into an active sub buffer of a sub partition based on the right side of the hash result for that data element, the portion of the hash result not used to assign the data element to a partition buffer as described above. In the case where there is only one sub partition per partition as described above with respect to step 248, assignment to the single sub partition is made based on the assignment to the partition, without further reference to the hash result, or may be based on the hash result. Alternatively, the assignment may be made to the entire range of hash results within the range identified for the partition. In addition to the data element, the hash result and the identifier of the data element are stored. The core maintains, for each sub buffer, the amount of data stored in the active sub buffer at any given time as part of step 264.

The core then checks to see if the sub buffer into which the data element was stored is full or nearly full 266. If the sub buffer is not full or nearly full 268, the method continues at step 284 of FIG. 2C. At step 284, the core checks to see if there are more data elements in the selected buffer. If there are more data elements in the selected buffer 286, the core continues at step 262 to process another data element not already processed from the selected partition of the first data set. Otherwise 286, the method continues at step 288.

If the sub buffer is full or nearly full 268, the method continues at step 276 of FIG. 2C. Referring now to FIG. 2C, at step 276, a hash table is generated for the inactive sub buffer containing, for each data element in the sub buffer, a pointer (as an offset from the start of the sub buffer) to the data element and a hash that is the bitwise or bytewise reverse of the full hash of the data element (optionally excluding the portion of the hash result that is written to the label as described below). The designations of the active and inactive sub buffers are reversed and the now inactive sub buffer is written to disk with its hash table 278.

In one embodiment, all sub buffers for a sub partition that are written are linked backwards to the prior written sub buffer for the same sub partition. In such embodiment, if there is a prior-written sub buffer for the same sub partition as the sub buffer just written 280, a link to the prior written sub buffer on disk is generated and written into the most recent written sub buffer on disk 282, thus linking them. The method continues at step 284.

In one embodiment, in the case of a single sub partition per partition, the buffers stored may be used as sub buffers by merely generating a hash table for each buffer and then either storing the hash tables separately from the buffer or rewriting them as sub buffers with integrated hash tables, linked as described above without storage to disk, and in another embodiment, they are stored to disk as described in the case in which there are multiple partitions and sub partitions.

At step 284, the selected partition is checked to determine if there are more data elements not already processed as described above. If there are more such data elements 286, the method continues at step 262 and otherwise 286, the method continues at step 288.

At step 288, all active sub buffers are written to disk along with hash tables generated as described above, and linked to any prior written sub buffer for the same sub partition as described above. The headmost sub buffer written to disk for each sub partition is also labeled with the range of bits in the hash result to which the sub partition corresponds, including the bits corresponding to the partition to which the sub partition corresponds (in the example above, the range of the entire hash result to which the sub partition corresponds is written into the label). As part of step 288, the metadata used to determine if a processed version of the first data set has been stored in step 214 may be stored, for example, as part of the label for the file, as part of the file name or as part of a separate database.

A check is made to determine whether any additional unprocessed partitions remain in the first data set. If so 290, the method continues at step 260 to begin again using a newly-selected partition, and otherwise 290, the method continues at step 312 of FIG. 3A.

Figure 3A:
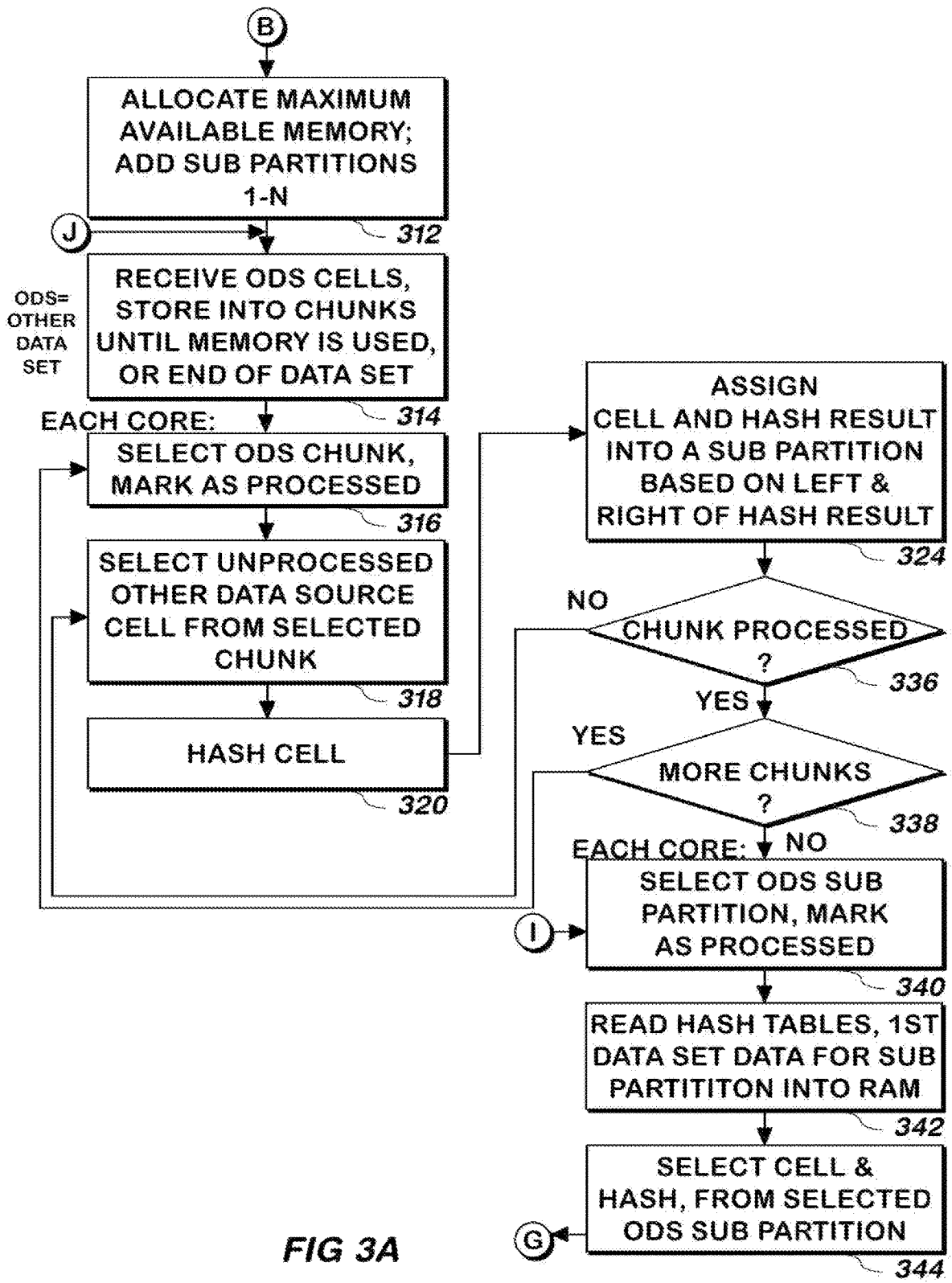
FIG. 3A is a part of the flowchart illustrating a method of matching data from different sets of data using a multi core processing system according to one embodiment of the present invention.

Referring now to FIG. 3A the maximum available memory is allocated 312 and cells from the other data set are received and stored into chunks of memory until the memory is full (except for that which will be used as described herein) or the end of the other data set is reached 314. A chunk of memory is an identifiable portion of the memory. The other data set is the data set not already processed as described above or not the stored preprocessed data set that was used as described above. Cells from the other data set are data elements, for example a row of a column of a database, where the column is the other data set.

One core can perform steps 316-338, or each core of a multi core computing system performs steps 316-336 simultaneously with the other cores, as will now be described. A chunk not marked as processed is selected and marked as processed 316. An unprocessed cell from the selected chunk is selected 318. The cell is hashed 320 using the same hash function as was used for the first data set and the identifier of the cell (such as a row number received with the cell or implied from the order of receipt of the cell). If the number of subpartitions per partition is greater than one 322, the hash result is stored, bitwise or bytewise reversed, associated with the cell, and the cell and hash result are assigned to a sub partition based upon the entire (not reversed) hash result 324 using the same ranges of hash results to assign cells to sub partitions of the other data set as were used to assign data elements to sub partitions of the first data set, with the ranges having been stored if the first data set was processed for the request, or read from the stored head sub buffers for the stored sub partitions if the first data set uses a version of the processed first data set that was stored before the request was received. As noted, each sub partition in the other data set corresponds to the same range of hash results as each of the sub partitions of the first data set. In one embodiment, assignment to a sub partition means copying the data into a separate area of memory for that sub partition and storing the bitwise or bytewise reversed hash result in the sub partition with the data. The method continues at step 336. If the number of sub partitions per partition is one 322, the cell and its hash result are assigned to the sub partition for the partition to which it was assigned 324, and the method continues at step 336.

At step 336, if all the cells in the other data set chunk selected have not been fully processed, the method continues at step 318. Otherwise 336, if there are more unprocessed chunks 338, the method continues at step 316. If there are no more unprocessed chunks 338, the method continues at step 340.

Each core of the multi core processor performs steps 340-364 simultaneously with the other cores at some point in the cycle, with some cores finishing processing as per steps 316-336 and other cores starting in on subsequent steps when there is no further processing using steps 340-364. In the case of a single sub partition for the entire first data set, a single core can perform such steps for that partition.

At step 340, a sub partition is selected. The data elements and the hash tables from the first data set sub partition corresponding to the selected sub partition of the other data set are read into RAM 342 either from the processed first data set or the earlier processed and stored first data set. A cell and its hash result, bitwise or bytewise reversed, is selected from the other data set sub partition selected 344 and the method continues at step 350 of FIG. 3B.

Figure 3B:
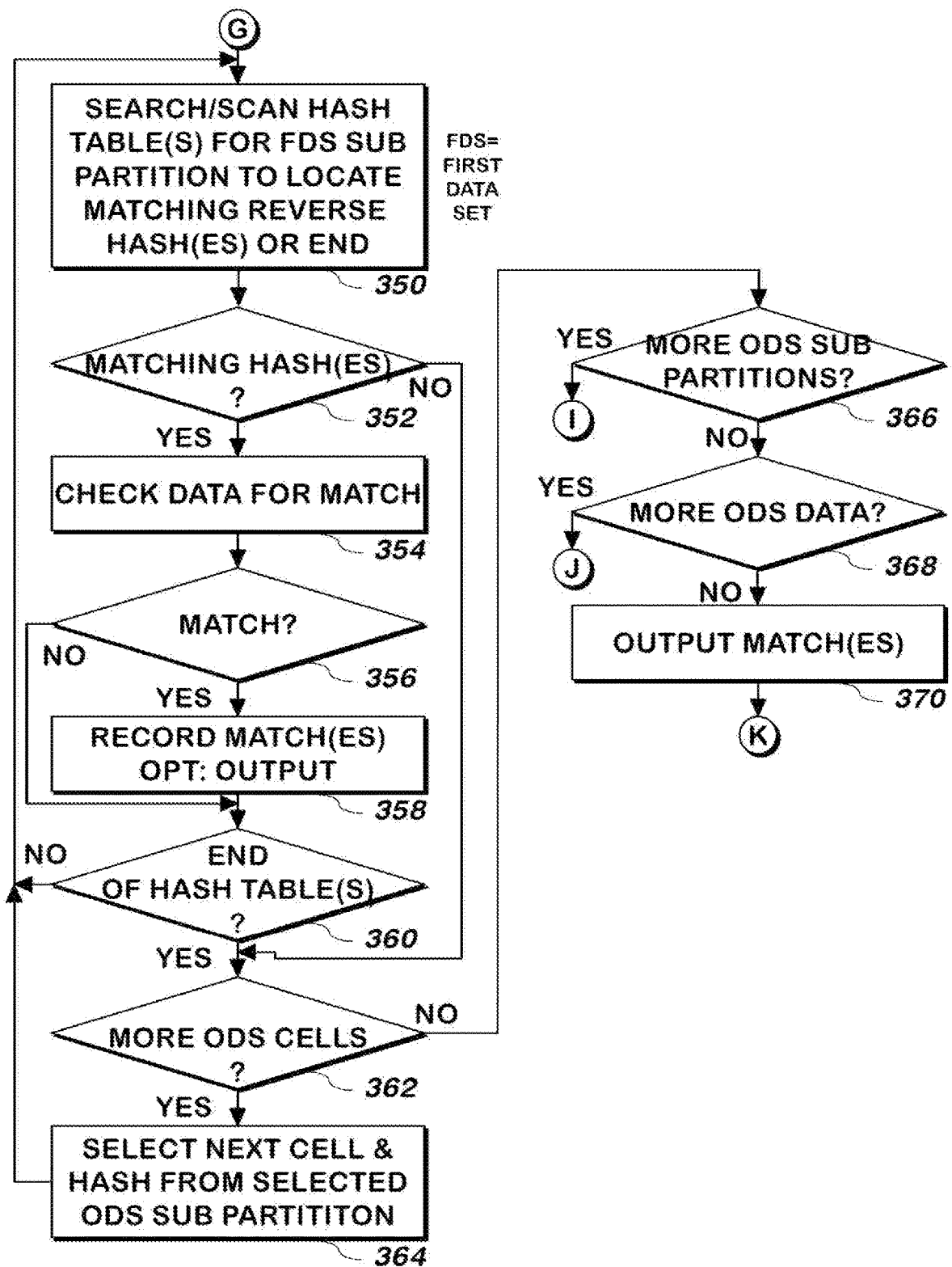
FIG. 3B is a part of the flowchart illustrating a method of matching data from different sets of data using a multi core processing system according to one embodiment of the present invention.

Referring now to FIG. 3B, the hash table or tables read are searched to identify matching hashes with the selected cell of the other data set 350, and if a match is located 352, the cell is compared to the corresponding data from the first data set to identify whether there is a match 354. If there is a match 356 the match is recorded (by recording the identifier of the cell and the identifier of the data element that matched), and the match is optionally output, 358 and the method continues at step 360, and otherwise 356, the method continues at step 360. If the hash of the selected cell does not match any of the remaining hashes in the hash table or tables read for the sub partition corresponding to the cell 352, the method continues at step 362.

At step 360, if the match is with the last entry in the last hash table, the method continues at step 362 and otherwise, matching continues from the most recently matching entry in the hash table(s) at step 350.

At step 362, if there are more other data set cells in the selected sub partition, the next cell and its hash are selected from the selected other data set sub partition 364, and the method continues at step 350 using the newly selected cell and hash, and otherwise 362, the method continues at step 366.

At step 366, if there are more other data set sub partitions that have not been processed 366, the method continues at step 340 where a new sub partition is selected and processed as described above and herein. If there are no more other data set sub partitions that have not been processed 366, if there is more other data set data that has not been read 368, the method continues at step 314 to process additional other data set cells. Otherwise 368, the matches may be output 370 and the method continues at step 210.

System.

Figure 4:
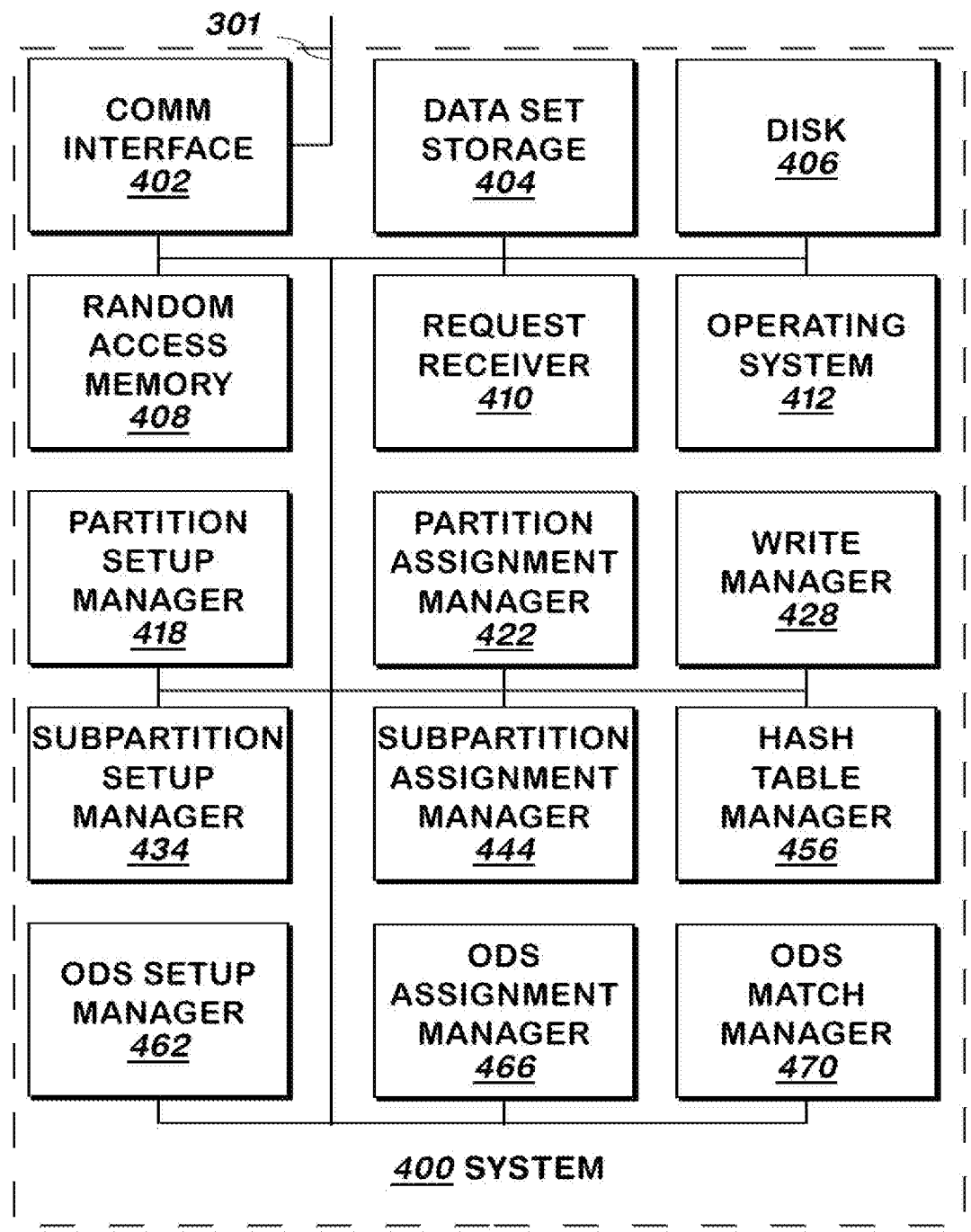
FIG. 4 is a block schematic diagram of a system for matching data from different sets of data according to one embodiment of the present invention.

Referring now to FIG. 4, a system 400 for matching data elements from a first data set with cells from an other data set is shown according to one embodiment of the present invention. All information is received by an element via an input of that element and provided by an output of that element, the inputs and outputs including a conventional wire or other similar connector and each element including a conventional processor. The system operates as described above, with any element being able to perform any function described above. Some of the elements of FIG. 4 are duplicated in each of several cores, but only one copy of that element is illustrated to avoid cluttering the Figure.

Communication interface 402 is a conventional communication interface running suitable communication protocols, such as TCP/IP and Ethernet and is coupled via input/output 401 to a communications network, such as an Ethernet network coupled to the networks that make up the Internet. Unless otherwise noted, all communication into or out of the system of FIG. 4 is made via input/output 401 of communication interface 402.

Data set storage 404 includes RAM or disk storage or other forms of storage, and may include a conventional database.

Random access memory 408 is a conventional memory.

Disk 406 is a conventional storage device such as a conventional disk or conventional solid state disk.

Operating system 412 is a conventional operating system, such as Linux or Windows or other conventional operating system.

Request receiver 410 receives the request to match data from two data sets as described above. The request includes file names or other information identifying the two data sets. Request receiver 410 estimates the sizes of each of the two data sets as described above, by reading the data sets, or metadata describing the data sets, from data set storage 404, which may include a conventional disk or solid-state disk drive. Request receiver 410 provides to stored version manager 414 information about one or both data sets received with the request, such as file names, and metadata, such as last modified date and time, about the data sets received with the request, or retrieved by request receiver 410 from operating system 412. Stored version manager 414 uses such information to identify whether a preprocessed version of the smaller data set, or of either data set is stored on disk 406 as described above. If the smaller data set, or either data set is not stored as described above, stored version manager 414 opens both files, builds in RAM 408 a partition object with the handles to the files containing the unprocessed versions of the two data sets, and provides a pointer to the partition object to partition set up manager 418.

When it receives the pointer to the partition object, partition set up manager 418, requests from operating system 412 as much memory 408 as operating system 412 can assign to it, allocates some or all of such assigned random access memory 408 into partitions of N double buffers, where N is identified as described above, assigns an identifier to each partition, stores each identifier in the partition object, stores into the partition object pointers to each buffer as a 2N-tuple, with the pair of pointers for each partition stored one after the other, and marks one buffer of each double buffer pair as active, the other as inactive. Partition set up manager 418 assigns a range of hash results to each partition as described herein, and stores in the partition object, each such range associated with the pointers to the buffers for the partition, to which the range is assigned. Partition set up manager 418 receives as part of the memory allocation request, or requests and receives from operating system 412 the amount of memory available and the amount of CPU cache and the number of cores (which may be instead received from a system administrator via a user interface provided by partition set up manager 418), and partition set up manager 418 stores all such information into the partition object. Partition set up manager 418 signals the partition assignment manager 422 for the multicore system, or for each core in the multicore system, with a pointer to the partition object.

When signaled, each such partition assignment manager 422 locks and reads the partition object, and some or all of the first data set not already read by that partition assignment manager 422 or another partition assignment manager 422 of a different core, stores an indication of the data sets that it has read into the partition object and stores and unlocks the partition object, selects a data element that it read from the first data set, hashes the selected data element to produce a hash result, reads the partition object, and stores the selected data element, its identifier, such as a row identifier or index, and its hash result into the active buffer of the partition whose range corresponds to that hash result, according to the partition object.

As it processes the data elements from the first data set, each partition manager 422 checks to see if the active buffer for the partition into which it stored the most recent data element is full. If so, that partition assignment manager 422 locks and reads the partition object. The partition manager 422 then swaps the active and inactive designations in the partition object for the buffers corresponding to that partition, removes the indication that the partition object is locked, stores the partition object into RAM, and signals write manager 428 with the pointer to the partition object, the identifier of the partition, and a pointer to the now inactive, full, buffer, which write manager 428 writes to disk 406 as described above. Write manager 428 locks and reads the partition object, and if it is unlocked, stores in the partition object a pointer to the buffer it wrote associated with the identifier of the partition and writes to RAM 408 and unlocks the partition object. It is noted that the partition object may be made of several components, each of which may be locked separately so that the entire partition object need not be locked at the same time.

Each partition assignment manager 422 checks to see if there are additional data elements in the first data set that it read, and if so, such partition assignment manager 422 continues processing the data elements as described above. When a partition assignment manager 422 has processed all of the data elements that it read, that partition assignment manager 422 checks the partition object in random access memory 408 for an indication that all of the first data set has been read, and if no such indication is stored in the partition object, attempts to read additional data elements from the first data set. If there are more such data elements in the first data set, the partition assignment manager 422 repeats the process of reading and processing data elements from the first data set as described above. If there are no more such data elements in the first data set, the partition assignment manager 422 locks, reads and stores into, the partition object, an indication that all data elements have been read, writes it into RAM 408 and unlocks it. When all partition assignment managers 422 have indicated there are no more unprocessed data elements in the first data set, the last such partition assignment manager 422 signals write manager 428 to write all of the active buffers for all partitions to disk as described herein, for example, by providing the identifiers of the partition, pointers to the active buffers for the partition, and the pointer to the partition object, for each partition that has at least one data element in its active buffer. Write manager 428 reads the partition object, and writes all of the active buffers for each partition to disk 406, with the identifiers of the partition to which the buffer corresponds, and a pointer to the buffer on disk to the partition object and stores the partition object to RAM 408. Write manager 428 signals sub partition set up manager 434.

In one embodiment, as a write manager 428 writes a partition buffer to disk, it stores a size of the data elements, hashes and identifiers in the buffer and a number of data elements into the partition object after locking it, and reading it, and then stores the partition object and unlocks it.

When signaled, sub partition set up manager 434 releases the RAM reserved as described above, and requests from the operating system 412 as much memory 408 as can be requested or continues to use the RAM, reserved as described above. Sub partition set up manager 434 sums the sizes of the partition buffers and number of data elements from the partition object and the sizes of memory and cache to determine whether the data elements and their associated hashes and identifiers will fit into the cache or memory as described above, with sufficient room to perform the other operations for matching as described herein, such as building a hash table (whose size can be determined from the number of data elements). If such information fits in the cache with sufficient capacity for the other information needed, such as the hash table, sub partition set up manager 434 signals one of the sub partition assignment managers 444 with an indication to build a single sub partition using the data stored in memory (or from the disk), including rehashing the data elements if necessary. The sub partition assignment manager 444 then signals hash table manager 456 with a pointer to the memory containing such information an indication that a single sub partition for the first data set is being built, which builds a hash table for the single partition and stores it associated with the sub partition and provides the pointer to the memory and the hash table and an indication of the size of such information including the hash table, to ODS setup manager 462 with an indication that only one sub partition for the first data set is built. Sub partition set up manager 434 identifies the number of sub partitions based on the RAM it was able to reserve as described above, the number of cores, which may be received from the operating system, or may be programmed into sub partition set up manager 434, and a sub buffer size that it will use for each sub buffer in each sub partition, as described above. As noted, if the size of the data elements of the first data set does not fit into the cache, but fits in the memory with sufficient capacity for the other information needed to perform the matching functions described herein, sub partition set up manager 434 will set up one sub partition per partition. Otherwise, sub partition set up manager 434 sets up a double buffer for each core, and identifies one buffer of each double buffer as active, and the other as inactive, and stores into the partition object pointers to each sub buffer for each core, and the designation as active or inactive, for each buffer of a sub partition. Sub partition setup manager 434 also stores into the partition object, for each sub partition, the range of the portion of the hash result that was not used to assign the data element to a partition and stores in the partition object the ranges and an index or other identifier that identifies the sub partition for each range. Sub partition setup manager 434 stores into the partition object an indicator of the number and arrangement of the sub buffers (e.g. only one, one per buffer, or the number of sub buffers per buffer) and any other information that can be used to perform the functions described herein. Sub partition set up manager 434 stores the partition object into RAM 408 and signals all of the sub partition assignment managers 444 in each core with a pointer to the partition object.

When signaled, the sub partition assignment manager 444 in each core locks and reads the partition object, selects a partition not marked as processed in the partition object, stores into the partition object stored in RAM, an identifier of the selected partition to indicate that the selected partition has been processed, stores and unlocks the partition object in RAM 408, reads the buffers for the selected partition, one at a time as needed to continue processing data elements, and processes each data element in the selected partition as described herein. To process each data element, the sub partition assignment manager 444 identifies the sub partition in which to store it using the hash result for the data element and the ranges for each sub partition from the partition object, stores the data element, its identifier, and the hash result into the active sub buffer of the sub partition, and checks to see if the sub buffer it just wrote is full or nearly full. The elements that write to buffers and sub buffers may maintain a number of bytes in them as metadata for this purpose. As noted, a single sub partition for each partition may be assigned by sub partition assignment manager without regard to the hash result, using only the partition assignment.

If the sub buffer is full or nearly full, sub partition assignment manager 444 signals the hash table manager 456 for that core (there is one for each core) with an identifier of the partition and sub partition and a pointer to the full and active sub buffer, and then it swaps in the copy of the partition object it read the designations of active and inactive for the sub buffers for that sub partition and continues processing as described above.

When signaled, hash table manager 456 generates a hash table for the sub buffer corresponding to the pointer it receives, sorts the hash table according to hash result, and writes the buffer and the hash table to disk, links the sub buffer to the prior stored sub buffer with the same buffer and sub buffer identifiers, and internally maintains a pointer to the end of the linked list of each sub partition of each partition, identified by the identifiers of the partition and sub partition, for use in linking any subsequent buffer for that sub partition.

The sub partition assignment manager 444 continues processing the data elements in the selected buffer until all data elements in the selected buffer have been processed, at which point sub partition assignment manager 444 signals the hash table manager 456 for that core with an identifier of the partition and sub partition, a pointer to the sub buffer for each of the active sub buffers, and a pointer to the partition object, along with an indication that the sub buffer is the last sub buffer for each sub partition. Hash table manager 456 checks each sub buffer for any contents (using metadata sub partition assignment manager 444 maintains in the sub buffer) and if the sub buffer contains at least one data element, sub partition assignment manager 444 stores it to disk and links it to the predecessor sub buffer for that sub partition. Hash table manager 456 also adds a pointer to the last sub buffer on disk for each sub partition of each partition to the partition object, with the identifiers of the sub partition and partition and hash result ranges for each partition and sub partition, after locking and reading the partition object, and then writes and unlocks the partition object.

Each sub partition assignment manager 444 continues processing additional partitions until there are no remaining unprocessed partitions. When there are no more unprocessed partitions, each sub partition assignment manager 444 stores an indication that it is finished in the partition object, and checks for the number of such indications prior to such storage: when there are N−1 such indications for N cores, the sub partition assignment manager 444 for the last core stores the partition object to disk and signals ODS setup manager 462 with a handle to the file containing the first data set and the partition object, and the handle to the other data set from the partition object.

In the event that a stored version of the file is to be used as described above, stored version manager 414 opens the preprocessed version of the first data set selected as described above and the other data set, and signals ODS setup manager 462 with the handle to the file containing the first data set, processed previously as described above, and the handle to the other data set. Handles to files are used as described herein, but other references of the data sets may be used in other embodiments.

When it receives the handles to the files, ODS setup manager 462 reads the partition object from the file, allocates the maximum available memory 408 from operating system 412 or continues using the memory 408 allocated as described above, and builds an ODS object that contains identifiers of, and pointers to, buffers in the memory 408 for each sub partition for the other data set as described above, and the ranges of hash results to which each sub partition corresponds, so that there are the same number of sub partitions as were used for the first data set, the identifiers for each data set correspond to, and the hash result ranges match, those used for the sub partitions from the first data set. ODS setup manager 462 reads the partition object from the file, and stores it into memory 408. ODS setup manager 462 then uses the handle to receive into memory 408 the cells from the other data set until the memory 408 to be used by them is full (leaving room for the other operations described herein) or all cells have been received, stores them into chunks of memory 408 with an identifier such as a row number or order identifier (e.g. 0, 1, 2, etc.), adds pointers to each chunk into the ODS object, marks each chunk pointer as unprocessed, and signals the ODS assignment manager 466 in each of the cores with a pointer to the ODS object and a pointer to the partition object, both in memory 408.

If it receives the pointers to the first data set and the hash table in memory and the indication that a single subpartition was built, ODS setup manager 462 fills the remaining memory with cells (i.e. data elements) from the other data set, assigning and/or storing identifiers of the cells as described herein, stores the pointer to the data elements and hash table and an indication that only a single subpartition for the other data set was built into an ODS data object along with pointers, marked as unprocessed, to each chunk of memory holding the other data set, and signals each ODS assignment manager 466 in each core, with a pointer to the ODS data object in memory 408.

When signaled, each ODS assignment manager 466 reads the unlocked ODS data object, locks it, selects an unprocessed chunk of memory 408, marks it in the ODS object as processed, stores it into RAM 408 and unlocks the ODS data object. The ODS assignment manager 466 then processes the chunk it selected, as will now be described. The first cell in the chunk is selected, hashed using the same hash function as was used to hash the first data set, assigns the cell to an ODS sub partition using the left and right side of the hash result according to the ODS object or in the case of a single subpartition for the first data set, does not assign the cell but stores the hash result associated with the cell, and stores the cell, its identifier and its hash result into the sub partition buffer in accordance with the ranges of hash results for each sub partition listed in the ODS object, and then repeats the process for each cell in the selected chunk, all performed by the ODS assignment manager 466. When all cells for the chunk have been processed, the ODS assignment manager 466 repeats the process of selecting an unprocessed chunk, and processing the cells for that chunk. When there are no more chunks unprocessed, the ODS assignment manager 466 so indicates into a section of memory 408, and each one checks that section for indications from all ODS assignment managers 466 from each core. When all but one of the cores have so indicated, the last ODS assignment manager that would otherwise so indicate signals an ODS match manager 470 for each core with a pointer to the ODS data object and a pointer to the partition object if it was provided.

When so signaled, each ODS match manager 470 locks and reads the ODS object, selects a sub partition of the other data set not marked as processed, marks it as processed, stores the ODS object, and unlocks it, and processes the sub partition as described herein and above. To do so, the ODS match manager 470 reads into memory 408 the hash tables and data elements from the sub partition of the first data set that corresponds to the sub partition it selected and then selects the first cell from the sub partition it selected. ODS match manager 470 then attempts to locate in the hash tables hashes that match the hash result of the selected cell. In the case of the ODS object indicating a single subpartition for the first data set, each ODS match manager 470 processes a chunk of memory at a time, using the ODS object to lock it, and uses the hash table and first data set data in memory corresponding to the pointer in the ODS object.

For all matching hash results or the first matching hash result, ODS match manager 470 checks the corresponding data element for a match with the selected cell, and if a match exists, outputs or stores into memory 408 the identifiers of the data element and the cell. Each ODS match manager 470 repeats the process for all cells in the selected partition, and then repeats the process of selecting a sub partition of the other data set and processing all of the cells of that sub partition as described above. When there are no more sub partitions not marked as processed, each ODS match manager 470 checks a section of RAM 408 and so indicates in a designated portion of the section of RAM 408 for that ODS match manager 470. When all but one have so indicated, the last ODS match manager intending to indicate signals ODS setup manager 462.

ODS setup manager 462 then uses the handle to receive into memory 408 any additional cells from the other data set until the memory 408 to be used by them is full or all cells have been received, stores them into chunks of memory 408 with the identifier such as a row number or order identifier, adds pointers to each chunk into the ODS object, marks each chunk pointer as unprocessed, and signals the ODS assignment manager 466 in each of the cores with a pointer to the ODS object and a pointer to the partition object, (overwriting the chunk pointers and their unprocessed/processed marks and the cells from the prior iteration) both in memory 408. The process repeats as described above until all cells from the other data set have been processed in this manner.

In one embodiment the single partition for the first data set is written to disk 409 with an identifier of the size of the CPU cache required to use it, or the one sub partition per partition is written to disk with an identifier of the size of the memory required to use it by write manager 428 (having been signaled to do so with a pointer to it by hash table manager 456 in the case of the single subpartition for the first data set). Stored version manager 414 requests the memory from operating system 412 and also requests the amount of cache from operating system 412, provides the amount to partition set up manager 418 and ensures that the assigned memory or CPU cache meets the requirements of any stored version, or choosing a different version that does and treating the version as not existing if it does not. If the system can support multiple such versions, it chooses the version with the largest requirements that the system can meet within versions that have memory requirements or those that have cache requirements. As between stored versions where some have memory requirements and others have cache requirements, all met by the system, the version that has a cache requirement that the system can meet is preferred.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

Any number of database data sets may be joined with any number of other database data sets as described above. For example a first database data set and its associated information may all fit in the cache with extra space for operations described herein and be joined with an other database data set. A second database data set and its associated information may fit in memory with extra space for operations described herein but not in the cache, and it may be joined with the other database data set or with another database data set or the first database data set. A third database data set and its associated information may not fit in memory or cache with room for other operations described herein may be joined with the other database data set, the another database data set or a fourth database data set or the first or second database data set.

Certain Embodiments

Described is a method of joining a first database data set and a second database data set, the method including:
  A. identifying a size of a storage space to be used for joining the first database data set and the second database data set;
  B. identifying a number of two or more processor cores to be used for joining the first database data set and the second database data set;
  C. hashing each of two or more data elements of the first database data set to produce a first hash result for each of the two or more data elements, each first hash result including a first portion and a second portion, the first and second portions each including less than all of the first hash result and not entirely overlapping with each other;
  D. assigning each of the two or more data elements of the first database data set to one of two or more buffers, responsive to the first portion of the first hash result for each of the respective data elements in the two or more;
  E. identifying a number of two or more sub buffers responsive to the size of the storage space identified, the number of processor cores identified, and a size to be used substantially as a size for each of the two or more sub buffers, each sub buffer corresponding to a range of potential first hash results, two or more sub buffers corresponding to each buffer;
  F. by each of the two or more processor cores, substantially simultaneously with the other processor cores:
    1. selecting a buffer in the two or more not already selected by any of the two or more processor cores;
    2. assigning each of the two or more data elements assigned to the selected buffer, to one of the sub buffers in the two or more, responsive to the second portion of the first hash result of each said data element and the range of potential hash results of the one of the sub buffers;
    3. generating a hash table for each data element assigned to each sub buffer including a first alternate hash result for each data element that is generated using, and different from, the first hash result for the data element;
4. storing in storage other than random access memory each sub buffer corresponding to the selected buffer and the hash table of said sub buffer; and
5. repeating steps 1-4 until all buffers in the two or more have been selected;

G. receiving a portion, less than all, of two or more data elements of the second database data set into two or more chunks of memory;

H. by each of the two or more processor cores, substantially simultaneously with the other processor cores:
1. selecting one of the two or more chunks not already selected by any of the two or more processor cores; and
2. for each of the two or more data elements in the selected chunk:
   a. hashing the data element in the selected chunk to produce a second hash result for said data element;
   b. assigning the data element to a sub partition of the selected chunk to one of two or more sub partitions, each of the sub partitions in the two or more being assigned a range of potential second hash results equal to a range of a different one of the sub buffers, said assigning being responsive to the range of potential second hash results of the sub partition and the second hash result of said data element in the second chunk; and
3. repeating steps 1 and 2 until all of the chunks have been processed;

I. by each of the two or more processor cores, substantially simultaneously with the other processor cores:
1. selecting one of the two or more sub partitions not already selected by any of the two or more processor cores;
2. reading the hash table and data elements of the first database data set of any sub buffer having a range of potential first hash results corresponding to the range of potential second hash results of the selected sub partition;
3. for each of the two or more data elements in the selected sub partition:
   a. identifying whether a second alternate hash result, generated using, and different from, the second hash result of said data element corresponds to the first alternate hash result; and
   b. if the second alternate hash result corresponds to the first alternate hash result, comparing said data element in the selected sub partition with the data element in the sub buffer read that corresponds to the corresponding first alternate hash result, and if the comparing results in a match, identifying the data element in the sub buffer read that corresponds to said data element; and
4. repeating steps 1-3 until all of the sub partitions have been selected; and J. Repeating steps G-I until all of the two or more data elements of the second database data set have been processed as in steps G-I.

The method may additionally include:
estimating sizes of each of said two database data sets; and
assigning as the first database data set one of said two database data sets with a smaller estimated size.

The method may include an optional feature whereby steps A-F are performed prior to specification of the second database data set.

The method may include an optional feature whereby two or more the sub buffers are each assigned to a same entire range of potential first hash results.

The method may optionally additionally include assigning a label to each of the two or more sub buffers, the label responsive to at least a part of the range of potential first hash results corresponding to each said sub buffer.

The method may include an optional feature whereby the first alternate hash result comprises a different ordering of the first hash result.

Described is a system for joining a first database data set and a second database data set, the system including:
A. a partition set up manager for identifying via an input/output a size of a storage space to be used for joining the first database data set and the second database data set, and for identifying via the partition setup manager input/output a number of two or more processor cores to be used for joining the first database data set and the second database data set, and for providing at an output the size of the storage space and the number of the two or more processors;
C. a partition assignment manager having an input for receiving two or more data elements of the first database data set, the partition assignment manager for hashing each of the two or more data elements of the first database data set to produce a first hash result for each of the two or more data elements, each first hash result including a first portion and a second portion, the first and second portions each including less than all of the first hash result and not entirely overlapping with each other, and for assigning via an output each of the two or more data elements and the hash result produced therefrom, to one of two or more buffers, responsive to the first portion of the first hash result for each of the respective data elements in the two or more;
E. a sub partition setup manager having an input coupled to the partition setup manager output for receiving the size of the storage space and the number of the two or more processors, the sub partition setup manager for identifying at an output a number of two or more sub buffers responsive to the size of the storage space identified, the number of processor cores identified, and a size to be used substantially as a size for each of the two or more sub buffers, each sub buffer corresponding to a range of potential first hash results, two or more sub buffers corresponding to each buffer;
F. in each of the two or more processor cores, operating substantially simultaneously with the other processor cores:
1. a sub partition assignment manager having an input coupled to the sub partition setup manager output for receiving the identification of the number of the two or more sub buffers, and to the partition assignment manager output for receiving the second portion of the first hash result of each of the data elements of the first database data set, the sub partition manager for selecting via an input/output a buffer in the two or more not already selected by any of the two or more processor cores and for assigning via an output each of the two or more data elements assigned to the selected buffer, to one of the sub buffers in the two or more, responsive to the second portion of the first hash result of each said data element and the range of potential hash results of the one of the sub buffers, and for storing via the sub partition assignment manager output in storage other than random access memory each sub buffer corresponding to the selected buffer and;

3. a hash table manager having an input coupled to the partition assignment manager output for receiving at least a portion of the hash result and to the sub partition assignment manager output for receiving the assignment of the two or more data elements assigned to the sub buffers in the two or more, the hash table manager for generating a hash table for each data element assigned to each sub buffer including a first alternate hash result for each data element that is generated using, and different from, the first hash result for the data element, and for storing in storage other than random access memory via an output the hash table of said sub buffer, associated with said sub buffer; and wherein operation of the sub partition assignment manager and the hash table manager is repeated until all buffers in the two or more have been selected;

G. an ODS setup manager having an input for receiving a portion, less than all, of two or more data elements of the second database data set and for storing such portion into two or more chunks of memory via an output;

H. at each of the two or more processor cores, an ODS assignment manager having an input coupled to the ODS setup manager output for receiving at least the data elements of the second database data set in at least some of the two or more chunks of memory, the ODS assignment manager for selecting one of the two or more chunks not already selected by any of the two or more processor cores, and for each of the two or more data elements in the selected chunk: hashing the data element in the selected chunk to produce a second hash result for said data element; and providing an assignment via an output the data element to a sub partition of the selected chunk to one of two or more sub partitions, each of the sub partitions in the two or more being assigned a range of potential second hash results equal to a range of a different one of the sub buffers, said assignments being responsive to the range of potential second hash results of the sub partition and the second hash result of said data element in the second chunk, the ODS assignment manager in one of the two or more processor cores operating substantially simultaneously with the ODS assignment manager in each of at least one other of the processor cores in the two or more;

I. at each of the two or more processor cores, substantially simultaneously with the other processor cores: an ODS match manager having an input coupled to the ODS setup manager output for receiving some of the data elements of the second database data set, to the output of at least some of the ODS assignment managers for receiving at least some of the assignments, to the storage other than random access memory for receiving the hash table and data elements of the first database data set of two or more the sub buffers, the ODS match manager for 1. selecting via an input/output one of the two or more sub partitions not already selected by any of the two or more processor cores;
2. reading the hash table and data elements of the first database data set assigned to any sub buffer having a range of potential first hash results corresponding to the range of potential second hash results of the selected sub partition; and
3. for each of the two or more data elements in the selected sub partition:
   a. identifying whether a second alternate hash result, generated using, and different from, the second hash result of said data element corresponds to the first alternate hash result; and
   b. if the second alternate hash result corresponds to the first alternate hash result, comparing said data element in the selected sub partition with the data element in the sub buffer read that corresponds to the corresponding first alternate hash result, and if the comparing results in a match, identifying the data element in the sub buffer read that corresponds to said data element; and
4. repeating operation of 1-3 until all sub partitions have been so processed; and J. wherein operation of elements G-I are repeated until all of the two or more data elements of the second database data set have been processed by elements G-I.

The system may additionally include a request receiver having an input for receiving identifiers of said two database data sets and information about the first database data set and the second database data set, the request receiver for estimating sizes of each of said two database data sets responsive to said information, assigning as the first database data set one of said two database data sets with a smaller estimated size and for providing at an output the identifiers of the first database data set and the second database data set; and may include an optional feature whereby:

the partition assignment manager input is additionally coupled to the request receiver output for receiving the identifier of the first database data set, and the partition assignment manager receives the two or more data elements of the first database data set responsive to providing the identifier of the first database data set at the partition assignment manager output; and the ODS setup manager input is additionally coupled to the request receiver output for receiving the identifier of the second database data set, and the ODS setup manager receives the portions of the two or more data elements of the second database data set responsive to providing the identifier of the second database data set at the ODS setup manager output.

The system may include an optional feature whereby operation of elements A-F are performed prior to receipt of any element of the system of a specification of the second database data set.

The system may include an optional feature whereby two or more the sub buffers are each assigned to a same entire range of potential first hash results.

The system may include an optional feature whereby the hash table manager is additionally for assigning via the hash table manager output a label to each of the two or more sub buffers, the label responsive to at least a part of the range of first hash results corresponding to each said sub buffer.

The system may include an optional feature whereby the first alternate hash result comprises a different ordering of the first hash result.

Described is a computer program product including a nontransitory computer useable medium having computer readable program code embodied therein for joining a first database data set and a second database data set, the computer program product including computer readable program code devices configured to cause a computer system to:

A. identify a size of a storage space to be used for joining the first database data set and the second database data set;
B. identify a number of two or more processor cores to be used for joining the first database data set and the second database data set;
C. hash each of two or more data elements of the first database data set to produce a first hash result for each of the two or more data elements, each first hash result including a first portion and a second portion, the first and second portions each including less than all of the first hash result and not entirely overlapping with each other;
D. assign each of the two or more data elements of the first database data set to one of two or more buffers, responsive to the first portion of the first hash result for each of the respective data elements in the two or more;
E. identify a number of two or more sub buffers responsive to the size of the storage space identified, the number of processor cores identified, and a size to be used substantially as a size for each of the two or more sub buffers, each sub buffer corresponding to a range of potential first hash results, two or more sub buffers corresponding to each buffer;
F. by each of the two or more processor cores, substantially simultaneously with the other processor cores:
 1. select a buffer in the two or more not already selected by any of the two or more processor cores;
 2. assign each of the two or more data elements assigned to the selected buffer, to one of the sub buffers in the two or more, responsive to the second portion of the first hash result of each said data element and the range of potential hash results of the one of the sub buffers;
 3. generate a hash table for each data element assigned to each sub buffer including a first alternate hash result for each data element that is generated using, and different from, the first hash result for the data element;
 4. store in storage other than random access memory each sub buffer corresponding to the selected buffer and the hash table of said sub buffer; and
 5. repeat operation of computer readable program code devices F1-F4 until all buffers in the two or more have been selected;
G. receive a portion, less than all, of two or more data elements of the second database data set into two or more chunks of memory;
H. by each of the two or more processor cores, substantially simultaneously with the other processor cores:
 1. select one of the two or more chunks not already selected by any of the two or more processor cores; and
 2. for each of the two or more data elements in the selected chunk:
  a. hash the data element in the selected chunk to produce a second hash result for said data element;
  b. assign the data element to a sub partition of the selected chunk to one of two or more sub partitions, each of the sub partitions in the two or more being assigned a range of potential second hash results equal to a range of a different one of the sub buffers, said assigning being responsive to the range of potential second hash results of the sub partition and the second hash result of said data element in the second chunk; and
 3. repeat operation of computer readable program code devices H1 and H2 until all of the chunks have been processed;
I. by each of the two or more processor cores, substantially simultaneously with the other processor cores:
 1. select one of the two or more sub partitions not already selected by any of the two or more processor cores;
 2. read the hash table and data elements of the first database data set of any sub buffer having a range of potential first hash results corresponding to the range of potential second hash results of the selected sub partition;
 3. for each of the two or more data elements in the selected sub partition:
  a. identify whether a second alternate hash result, generated using, and different from, the second hash result of said data element corresponds to the first alternate hash result; and
  b. if the second alternate hash result corresponds to the first alternate hash result, compare said data element in the selected sub partition with the data element in the sub buffer read that corresponds to the corresponding first alternate hash result, and if the compare results in a match, identify the data element in the sub buffer read that corresponds to said data element; and
 4. repeating operation of I1-I3 until all of the sub partitions have been selected; and
J. repeat operation of computer readable program code devices G-I until all of the two or more data elements of the second database data set have been processed as specified by G-I.

The computer program product may optionally additionally include:
 estimating sizes of each of said two database data sets; and
 assigning as the first database data set one of said two database data sets with a smaller estimated size.

The computer program product may include an optional feature whereby computer readable program code devices A-F are performed prior to specification of the second database data set.

The computer program product may include an optional feature whereby two or more the sub buffers are each assigned to a same entire range of potential first hash results.

The computer program product may optionally additionally include computer readable program code devices configured to cause the computer system to assign a label to each of the two or more sub buffers, the label responsive to at least a part of the range of potential first hash results corresponding to each said sub buffer.

The computer program product may include an optional feature whereby the first alternate hash result comprises a different ordering of the first hash result.

What is claimed is:
1. A method of identifying matches between a first database data set and a second database data set, the method comprising:
(A) hashing each of a plurality of data elements of the first database data set to produce a first hash result for each of the plurality of data elements, each first hash result comprising a first portion and a second portion, the first and second portions each comprising less than all of the first hash result and not entirely overlapping with each other;

(B) assigning each of the plurality of data elements of the first database data set to one of a plurality of buffers, responsive to the first portion of the first hash result for each of the respective data elements in the plurality;
(C) by each of a plurality of processor cores, substantially simultaneously with the other processor cores:
  (1) selecting a buffer in the plurality not already selected by any of the plurality of processor cores;
  (2) assigning each of the plurality of data elements assigned to the selected buffer, to a sub buffer in a plurality of sub buffers, each sub buffer corresponding to a range of potential first hash results, a second plurality of sub buffers corresponding to each of the buffers, responsive to the second portion of the first hash result of each said data element and the range of potential first hash results of said one of the sub buffers;
  (3) generating a hash table for the data elements assigned to each sub buffer comprising a first alternate hash result for each said data element that is generated using, and different from, the first hash result for the respective data element;
  (4) storing in storage other than random access memory each sub buffer corresponding to the selected buffer, and the hash table of said sub buffer; and
  (5) repeating steps (1)-(4) until all buffers in the plurality have been selected;
(D) receiving a portion, less than all, of a plurality of data elements of the second database data set into a plurality of chunks of memory;
(E) by each of the plurality of processor cores, substantially simultaneously with other processor cores:
  (1) selecting one of the plurality of chunks of memory not already selected by any of the plurality of processor cores; and
  (2) for each of the plurality of data elements in the selected chunk:
    a. hashing said data element in the selected chunk to produce a second hash result for said data element;
    b. assigning the data element in the selected chunk to one of a plurality of sub partitions, each of the sub partitions in the plurality being assigned a range of potential second hash results equal to a range of a different one of the sub buffers, said assigning being responsive to the range of potential second hash results of said sub partition and the second hash result of said data element in the selected chunk of memory; and
  (3) repeating steps (1) and (2) until all of the chunks of memory have been processed;
F. by each of the plurality of processor cores, substantially simultaneously with other processor cores:
  (1) selecting one of the plurality of sub partitions not already selected by any of the plurality of processor cores;
  (2) reading the hash table and data elements of the first database data set of any sub buffer having a range of potential first hash results corresponding to the range of potential second hash results of the selected sub partition;
  (3) for each of the plurality of data elements in the selected sub partition:
    (a) identifying whether a second alternate hash result of said data element corresponds to any of the first alternate hash results of said any sub buffer; and
    (b) if the second alternate hash result corresponds to said any first alternate hash result, comparing said data element in the selected sub partition with the data element in the sub buffer read that corresponds to the corresponding first alternate hash result, and if said comparing results in a match, identifying as matched with said data element in the selected sub partition the data element in the sub buffer read that corresponds to said data element in the selected sub partition; and
  (4) repeating steps (1)-(3) until all of the sub partitions have been selected; and
(G) Repeating steps D-F until all of the plurality of data elements of the second database data set have been processed as in steps D-F.

2. The method of claim 1, additionally comprising:
estimating sizes of each of said two database data sets; and
assigning as the first database data set one of said two database data sets with a smaller estimated size.

3. The method of claim 1, wherein steps A-C are performed prior to specification of the second database data set.

4. The method of claim 1 wherein a second plurality of the sub buffers are each assigned to a same entire range of potential first hash results.

5. The method of claim 4 additionally comprising assigning a label to each of the second plurality of sub buffers, the label responsive to at least a part of the range of potential first hash results corresponding to each said sub buffer.

6. The method of claim 1, wherein the first alternate hash result comprises a different ordering of the first hash result.

7. A system for identifying matches between a first database data set and a second database data set, the system comprising:
  (A) a partition assignment manager having an input for receiving a plurality of data elements of the first database data set, the partition assignment manager for hashing each of the plurality of data elements of the first database data set to produce a first hash result for each of the plurality of data elements, each first hash result comprising a first portion and a second portion, the first and second portions each comprising less than all of the first hash result and not entirely overlapping with each other, and for assigning via an output each of the plurality of data elements and the first hash result produced therefrom, to one of a plurality of buffers, responsive to the first portion of the first hash result for each of the respective data elements in the plurality;
  (B) in each of a plurality of processor cores, operating substantially simultaneously with the other processor cores:
    (1) a sub partition assignment manager having an input coupled to the partition assignment manager output for receiving the second portion of the first hash result of each of the data elements of the first database data set, the sub partition assignment manager for selecting via an input/output a buffer in the plurality of buffers not already selected by any of the plurality of processor cores and for assigning via an output each of the plurality of data elements assigned to the selected buffer, to one sub buffer in a plurality of sub buffers, each such sub buffer corresponding to a range of potential first hash results, a second plurality of the sub buffers corresponding to each buffer in the plurality, responsive to the second portion of the first hash result of each said data element and the range of potential first hash results of the one of the sub buffers, and for storing via the sub partition assignment manager output in storage other than random access memory each sub buffer corresponding to the selected buffer and;

(2) a hash table manager having an input coupled to the partition assignment manager output for receiving at least a portion of the first hash result and to the sub partition assignment manager output for receiving of the plurality of data elements assigned to the sub buffers in the plurality, the hash table manager for generating a hash table for each sub buffer comprising a first alternate hash result, for each data element that is generated using, and different from, the first hash result for said data element, and for storing in the storage other than random access memory via an output the hash table of said sub buffer, associated with said sub buffer; and wherein operation of the sub partition assignment manager and the hash table manager is repeated until all buffers in the plurality have been selected and hash tables generated for all sub buffers;

(C) an ODS setup manager having an input for receiving a portion, less than all, of a plurality of data elements of the second database data set and for storing such portion into a plurality of chunks of memory via an output;

(D) at each of the plurality of processor cores, an ODS assignment manager having an input coupled to the ODS setup manager output for receiving at least the data elements of the second database data set in at least some of the plurality of chunks of memory, the ODS assignment manager for selecting one of the plurality of chunks not already selected by any of the plurality of processor cores, and for each of the plurality of data elements in the selected chunk: hashing said data element in the selected chunk to produce a second hash result for said data element, and providing an assignment via an output the data element in the selected chunk to one of a plurality of sub partitions, each of the sub partitions in the plurality being assigned a range of potential second hash results equal to a range of a different one of the sub buffers, said assignments being responsive to the range of potential second hash results of the sub partition and the second hash result of said data element in the selected chunk, the ODS assignment manager in one of the plurality of processor cores operating substantially simultaneously with the ODS assignment manager in each of at least one other of the processor cores in the plurality;

(E) at each of the plurality of processor cores, substantially simultaneously with the other processor cores: an ODS match manager having an input coupled to the ODS setup manager output for receiving some of the plurality of data elements of the second database data set, to the output of at least some of the ODS assignment managers for receiving at least some of the assignments, to the storage other than random access memory for receiving the hash table and data elements of the first database data set of a plurality of the sub buffers, the ODS match manager for (1) selecting via an input/output one of the plurality of sub partitions not already selected by any of the plurality of processor cores;

(2) reading the hash table and data elements of the first database data set assigned to any sub buffer having a range of potential first hash results corresponding to the range of potential second hash results of the selected sub partition; and (3) for each of the plurality of data elements in the selected sub partition:

(a) identifying whether a second alternate hash result of said data element corresponds to the first alternate hash result; and (b) if the second alternate hash result corresponds to the first alternate hash result, comparing said data element in the selected sub partition with the data element in the sub buffer read that corresponds to the corresponding first alternate hash result, and if the comparing results in a match, identifying at an output as matched with said data element in the selected sub partition the data element in the sub buffer read that corresponds to said data element in the selected sub partition; and (4) repeating operation of (1)-(3) until all sub partitions have been so processed; and (F) wherein operation of elements (C)-(E) are repeated until all of the plurality of data elements of the second database data set have been processed by elements (E)-(G).

8. The system of claim 7:

additionally comprising a request receiver having an input for receiving identifiers of the first database data set and the second database data set and information about the first database data set and the second database data set, the request receiver for estimating sizes of each of said two database data sets responsive to said information, assigning as the first database data set one of said two database data sets with a smaller estimated size and for providing at an output the identifiers of the first database data set and the second database data set; and wherein:

the partition assignment manager input is additionally coupled to the request receiver output for receiving the identifier of the first database data set, and the partition assignment manager receives the plurality of data elements of the first database data set responsive to providing the identifier of the first database data set at the partition assignment manager output; and the ODS setup manager input is additionally coupled to the request receiver output for receiving the identifier of the second database data set, and the ODS setup manager receives the portion of the plurality of data elements of the second database data set responsive to providing the identifier of the second database data set at the ODS setup manager output.

9. The system of claim 7, wherein operation of elements A-C are performed prior to receipt by any element of the system of a specification of the second database data set.

10. The system of claim 7 wherein a plurality of the plurality of sub buffers are each assigned to a same entire range of potential first hash results.

11. The system of claim 10, wherein the hash table manager is additionally for assigning via the hash table manager output a label to each of the plurality of sub buffers, the label responsive to at least a part of the range of potential first hash results corresponding to each said sub buffer.

12. The system of claim 7, wherein each first alternate hash result comprises a different ordering of the first hash result.

13. A computer program product comprising a nontransitory computer useable medium having computer readable program code embodied therein for identifying matches between a first database data set and a second database data set, the computer program product comprising computer readable program code devices configured to cause a computer system to:
- A. hash each of a plurality of data elements of the first database data set to produce a first hash result for each of the plurality of data elements, each first hash result comprising a first portion and a second portion, the first and second portions each comprising less than all of the first hash result and not entirely overlapping with each other;
- B. assign each of the plurality of data elements of the first database data set to one of a plurality of buffers, responsive to the first portion of the first hash result for each of said respective data elements in the plurality;
- C. by each of a plurality of processor cores, substantially simultaneously with the other processor cores:
  - (1) select a buffer in the plurality not already selected by any of the plurality of processor cores;
  - (2) assign each of the plurality of data elements assigned to the selected buffer, to a sub buffer in a plurality of sub buffers, each sub buffer corresponding to a range of potential first hash results, a second plurality of sub buffers corresponding to each of the buffers, responsive to the second portion of the first hash result of each said data element and the range of potential first hash results of said one of the sub buffers;
  - (3) generate a hash table for the data elements assigned to each said sub buffer comprising a first alternate hash result for each data element that is generated using, and different from, the first hash result for the respective data element;
  - (4) store in storage other than random access memory each sub buffer corresponding to the selected buffer, and the hash table of said sub buffer; and
  - (5) repeat operation of computer readable program code devices (C)(1)-(C)(4) until all buffers in the plurality have been selected;
- D. receive a portion, less than all, of a plurality of data elements of the second database data set into a plurality of chunks of memory;
- E. by each of the plurality of processor cores, substantially simultaneously with the other processor cores:
  - (1) select one of the plurality of chunks of memory not already selected by any of the plurality of processor cores; and
  - (2) for each of the plurality of data elements in the selected chunk:
    - (a) hash said data element in the selected chunk to produce a second hash result for said data element;
    - (b) assign the data element in the selected chunk to one of a plurality of sub partitions, each of the sub partitions in the plurality being assigned a range of potential second hash results equal to a range of a different one of the sub buffers, said assigning being responsive to the range of potential second hash results of said sub partition and the second hash result of said data element in the selected chunk; and
  - (3) repeat operation of computer readable program code devices (E)(1) and (E)(2) until all of the chunks of memory have been processed;
- (F) by each of the plurality of processor cores, substantially simultaneously with other processor cores:
  - (1) select one of the plurality of sub partitions not already selected by any of the plurality of processor cores;
  - (2) read the hash table and data elements of the first database data set of any sub buffer having a range of potential first hash results corresponding to the range of potential second hash results of the selected sub partition;
  - (3) for each of the plurality of data elements in the selected sub partition:
    - (a) identify whether a second alternate hash result of said data element corresponds to any of the first alternate hash results of said any sub buffer; and
    - (b) if the second alternate hash result corresponds to said any first alternate hash result, compare said data element in the selected sub partition with the data element in the sub buffer read that corresponds to the corresponding first alternate hash result, and if said compare results in a match, identify as matched with said data element in the selected sub partition the data element in the sub buffer read that corresponds to said data element in the selected sub partition; and
  - (4) repeat operation of (F)(1)-(F)(3) until all of the sub partitions have been selected; and
- (G) repeat operation of computer readable program code devices (D)-(F) until all of the plurality of data elements of the second database data set have been processed as specified by computer readable program code devices (D)-(F).

14. The computer program product of claim 13, additionally comprising:
estimating sizes of each of said two database data sets; and
assigning as the first database data set one of said two database data sets with a smaller estimated size.

15. The computer program product of claim 13, wherein computer readable program code devices A-F are performed prior to specification of the second database data set.

16. The computer program product of claim 13 wherein a second plurality of the sub buffers are each assigned to a same entire range of potential first hash results.

17. The computer program product of claim 16 additionally comprising computer readable program code devices configured to cause the computer system to assign a label to each of the second plurality of sub buffers, the label responsive to at least a part of the range of potential first hash results corresponding to each said sub buffer.

18. The computer program product of claim 13, wherein the first alternate hash result comprises a different ordering of the first hash result.

* * * * *